(12) United States Patent
Joseph et al.

(10) Patent No.: US 10,728,934 B2
(45) Date of Patent: Jul. 28, 2020

(54) TECHNIQUES AND APPARATUSES FOR MANAGING COMMUNICATIONS IN A PRIVATE WIRELESS NETWORK

(71) Applicant: QUALCOMM Incorporated, San Diego, CA (US)

(72) Inventors: Vinay Joseph, San Diego, CA (US); Rajat Prakash, San Diego, CA (US); Gavin Bernard Horn, La Jolla, CA (US); Miguel Griot, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/188,775

(22) Filed: Nov. 13, 2018

(65) Prior Publication Data

US 2019/0191470 A1 Jun. 20, 2019

Related U.S. Application Data

(60) Provisional application No. 62/599,833, filed on Dec. 18, 2017.

(51) Int. Cl.
*H04W 76/11* (2018.01)
*H04W 48/12* (2009.01)
*H04W 48/02* (2009.01)
*H04W 8/18* (2009.01)
*H04W 12/00* (2009.01)
(Continued)

(52) U.S. Cl.
CPC ............ *H04W 76/11* (2018.02); *H04W 8/186* (2013.01); *H04W 48/02* (2013.01); *H04W 48/12* (2013.01); *H04W 12/0052* (2019.01); *H04W 12/00514* (2019.01); *H04W 12/08* (2013.01); *H04W 84/045* (2013.01)

(58) Field of Classification Search
None
See application file for complete search history.

(56) References Cited

U.S. PATENT DOCUMENTS 6,826,414 B1 * 11/2004 Reynolds .............. H04W 48/02
455/432.1
2015/0281966 A1 * 10/2015 Griot ..................... H04W 12/08
726/5

FOREIGN PATENT DOCUMENTS

GB          2315193 A      1/1998

OTHER PUBLICATIONS

International Search Report and Written Opinion—PCT/US2018/060939—ISA/EPO—dated Feb. 11, 2019.
(Continued)

*Primary Examiner* — Hong S Cho
(74) *Attorney, Agent, or Firm* — Dalei Dong

(57) ABSTRACT

Certain aspects of the present disclosure generally relate to wireless communication. In some aspects, a method or an apparatus for wireless communication may include identifying an association with a wireless network having a public land mobile network identification (PLMN ID); identifying an association with a portion of the wireless network, the portion of the wireless network is a private wireless network; identifying an indication of the portion of the wireless network; the indication informs a user equipment that the portion of the wireless network is accessible using a private wireless network credential; and transmitting the indication of the portion of the wireless network. Numerous other aspects are provided.

26 Claims, 11 Drawing Sheets

(51) Int. Cl.
*H04W 84/04* (2009.01)
*H04W 12/08* (2009.01)

(56) References Cited

OTHER PUBLICATIONS

Nokia et al., "FS_BMNS Private Slice Selection" 3GPP Draft, S1-174538 FS_BMNS Private Slice Selection KB, 3rd Generation Partnership Project (3GPP), Mobile Competence Centre, 650, Route Des Lucioles, F-06921 Sophia-Antipolis Cedex, France, vol. SA WG1, No. Reno, NV, USA, Nov. 27, 2017-Dec. 1, 2017, Dec. 4, 2017 (Dec. 4, 2017), XP051379144, 2 Pages, Retrieved from the Internet:URL:http://www.3gpp.org/ftp/tsg%5Fsa/WG1%5FServ/TSGS1%5F80%5FReno/docs/ [retrieved on Dec. 4, 2017].
Nokia et al., "FS_BMNS Terminology Alignment", 3GPP Draft, S1-182481 Terminology Alignment, 3rd Generation Partnership Project (3GPP), Mobile Competence Centre, 650, Route Des Lucioles, F-06921 Sophia-Antipolis Cedex, France, vol. SA WG1, No. West Palm Beach, FL, USA, Aug. 20, 2018-Aug. 24, 2018, Aug. 29, 2018 (Aug. 29, 2018), XP0515349747, 13 Pages, Retrieved from the Internet:URL:http://www.3gpp.org/ftp/tsg%5Fsa/WG1%5FServ/TSGS1%5F83%5FWPalmBeach/Docs/S1%2D182481%2Ezip [retrieved on Aug. 29, 2018].
Qualcomm Incorporated: "Authentication for Private Slices" 3GPP Draft, S1-171281 Private Slices, 3rd Generation Partnership Project (3GPP), Mobile Competence Centre, 650, Route Des Lucioles, F-06921 Sophia-Antipolis Cedex, France, vol. SA WG1, No. Jeju, Korea, Feb. 13, 2017-Feb. 17, 2017, Feb. 20, 2017 (Feb. 20, 2017), XP051240295, 2 Pages, Retrieved from the Internet: URL:http://www.3gpp.org/ftp/tsg_sa/WG1_Serv/TSGS1_77_Jeju/docs/ [retrieved-on Feb. 20, 2017].

\* cited by examiner

TECHNIQUES AND APPARATUSES FOR MANAGING COMMUNICATIONS IN A PRIVATE WIRELESS NETWORK

PRIORITY CLAIM

This application claims the benefit of Provisional Patent Application Ser. No. 62/599,833 entitled "TECHNIQUES AND APPARATUSES FOR MANAGING COMMUNICATIONS IN A PRIVATE WIRELESS NETWORK" which was filed on Dec. 18, 2017. The aforementioned application is hereby expressly incorporated herein by reference in its entirety.

FIELD OF THE DISCLOSURE

Aspects of the present disclosure generally relate to wireless communication, and more particularly to techniques and apparatuses for managing communications in a private wireless network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The 5th Generation (5G) New Radio (NR) communications technology, used in a wide range of spectrum, is envisaged to expand and support diverse usage scenarios and applications with respect to current mobile network generations. As the demand for mobile broadband access continues to increase, there exists a need for further improvements in current communications technologies, 5G communications technology, and beyond. Preferably, these improvements should be applicable to other multi-access technologies and the telecommunication standards that employ these technologies.

SUMMARY

In some aspects, a method for wireless communication may include identifying an association with a wireless network having a public land mobile network identification (PLMN ID); identifying an association with a portion of the wireless network, the portion of the wireless network is a private wireless network; identifying an indication of the portion of the wireless network; the indication informs a user equipment that the portion of the wireless network is accessible using a private wireless network credential; and transmitting the indication of the portion of the wireless network.

In various aspects, the portion of the wireless network includes at least a part of an evolved packet core (EPC) and a radio access network (RAN). The indication of the portion of the wireless network includes a private wireless network identifier. In an aspect, transmitting the indication of the portion of the wireless network includes broadcasting the indication of the portion of the wireless network. In another aspect, transmitting the indication includes broadcasting the indication of the portion of the wireless network using information elements that are associated with the portion of the wireless network. In another aspect, transmitting the indication of the portion of the wireless network includes transmitting the indication of the portion of the wireless network in an information element associated with a closed subscriber group (CSG), for example, a closed subscriber group identifier (CSG-ID) or an indication of a closed subscriber group. The private wireless network credential is different from a credential used to access the wireless network.

In some aspects, a method for wireless communication may include receiving a public land mobile network identification (PLMN-ID) of a public wireless network; receiving an indication of a private wireless network; identifying a private wireless network credential associated with the private wireless network; determining whether the private wireless network supports the private wireless network credential; and accessing, based at least in part on the determination that the private wireless network supports the private wireless network credential, the private wireless network using the private wireless network credential.

In various aspects, the private wireless network credential is stored on a user equipment. The identifying the private wireless network credential is associated with the private wireless network is in part based on an indication associated with the private wireless network credential. In an example, the private wireless network credential is associated with a plurality of private wireless network identifiers. In another example, the private wireless network credential is stored in a universal subscriber identification module (USIM) application of the user equipment. In other example, the private wireless network credential is associated with a plurality of private wireless network identifiers. For example, the private wireless network identifiers are stored as part of a closed subscriber group identification (CSG-ID) in a universal subscriber identification module (USIM) application of the user equipment. The private wireless network credential is different from a credential used to access the public wireless network.

In some aspects, an apparatus for wireless communication may include a memory; a processor coupled to the memory, the processor is configured to: identify an association with a wireless network having a public land mobile network identification (PLMN ID); identify an association with a portion of the wireless network, the portion of the wireless network is a private wireless network; identify an indication of the portion of the wireless network; the indication informs a user equipment that the portion of the wireless network is accessible using a private wireless network credential; and transmit the indication of the portion of the wireless network.

In various aspects, the portion of the wireless network includes at least a part of an evolved packet core (EPC) and a radio access network (RAN). The indication of the portion of the wireless network includes a private wireless network identifier. The apparatus may be configured to transmit the indication of the portion of the wireless network includes the processor further configured to broadcast the indication of the portion of the wireless network. In another aspect, transmitting the indication includes broadcasting the indication of the portion of the wireless network using information elements that are associated with the portion of the wireless network. In an example, the apparatus may be configured to transmit the indication of the portion of the wireless network includes the processor further configured to transmit the indication of the portion of the wireless network in an information element associated with a closed subscriber group (CSG), for example, a closed subscriber group identifier (CSG-ID) or an indication of a closed subscriber group. The private wireless network credential is different from a credential used to access the wireless network.

In some aspects, an apparatus for wireless communication may include a memory; a processor coupled to the memory, the processor is configured to: receive a public land mobile network identification (PLMN-ID) of a public wireless network; receive an indication of a private wireless network; identify a private wireless network credential associated with the private wireless network; determine whether the private wireless network supports the private wireless network credential; and access, based at least in part on the determination that the private wireless network supports the private wireless network credential, the private wireless network using the private wireless network credential.

In various aspects, the private wireless network credential is stored on a user equipment. The identifying the private wireless network credential is associated with the private wireless network is in part based on an indication associated with the private wireless network credential. The private wireless network credential is associated with a plurality of private wireless network identifiers. The private wireless network credential is stored in a universal subscriber identification module (USIM) application of the user equipment. The private wireless network credential is associated with a plurality of private wireless network identifiers. The private wireless network identifiers are stored as part of a closed subscriber group identification (CSG-ID) in a universal subscriber identification module (USIM) application of the user equipment. The private wireless network credential is different from a credential used to access the public wireless network.

In some aspects, an apparatus for wireless communication may include means for identifying an association with a wireless network having a public land mobile network identification (PLMN ID); means for identifying an association with a portion of the wireless network, the portion of the wireless network is a private wireless network; means for identifying an indication of the portion of the wireless network; the indication informs a user equipment that the portion of the wireless network is accessible using a private wireless network credential; and means for transmitting the indication of the portion of the wireless network.

In various aspects, the portion of the wireless network includes at least a part of an evolved packet core (EPC) and a radio access network (RAN). The indication of the portion of the wireless network includes a private wireless network identifier. An apparatus may be configured to transmitting the indication of the portion of the wireless network includes broadcasting the indication of the portion of the wireless network. In another aspect, transmitting the indication includes broadcasting the indication of the portion of the wireless network using information elements that are associated with the portion of the wireless network. An apparatus may be configured to transmitting the indication of the portion of the wireless network includes transmitting the indication of the portion of the wireless network in an information element associated with a closed subscriber group (CSG), for example, a closed subscriber group identifier (CSG-ID) or an indication of a closed subscriber group. The private wireless network credential is different from a credential used to access the wireless network.

In some aspects, an apparatus for wireless communication may include means for receiving a public land mobile network identification (PLMN-ID) of a public wireless network; means for receiving an indication of a private wireless network; means for identifying a private wireless network credential associated with the private wireless network; means for determining whether the private wireless network supports the private wireless network credential; and means for accessing, based at least in part on the determination that the private wireless network supports the private wireless network credential, the private wireless network using the private wireless network credential.

In various aspects, the private wireless network credential is stored on a user equipment. The identifying the private wireless network credential is associated with the private wireless network is in part based on an indication associated with the private wireless network credential. The private wireless network credential is associated with a plurality of private wireless network identifiers. The private wireless network credential is stored in a universal subscriber identification module (USIM) application of the user equipment. The private wireless network credential is associated with a plurality of private wireless network identifiers. The private wireless network identifiers are stored as part of a closed subscriber group identification (CSG-ID) in a universal subscriber identification module (USIM) application of the user equipment. The private wireless network credential is different from a credential used to access the public wireless network.

In some aspects, a non-transitory computer-readable medium for storing computer executable codes, the codes may include codes for identifying an association with a wireless network having a public land mobile network identification (PLMN ID); codes for identifying an association with a portion of the wireless network, the portion of the wireless network is a private wireless network; codes for identifying an indication of the portion of the wireless network; the indication informs a user equipment that the portion of the wireless network is accessible using a private wireless network credential; and codes for transmitting the indication of the portion of the wireless network.

In various aspects, the portion of the wireless network includes at least a part of an evolved packet core (EPC) and a radio access network (RAN). The indication of the portion of the wireless network includes a private wireless network identifier. The codes may include transmitting the indication of the portion of the wireless network includes broadcasting the indication of the portion of the wireless network. The codes may include transmitting the indication of the portion of the wireless network includes transmitting the indication of the portion of the wireless network in an information element associated with a closed subscriber group (CSG), for example, a closed subscriber group identifier (CSG-ID) or an indication of a closed subscriber group. The private wireless network credential is different from a credential used to access the wireless network.

In some aspects, a non-transitory computer-readable medium for storing computer executable codes, the codes may include codes for receiving a public land mobile network identification (PLMN-ID) of a public wireless network; codes for receiving an indication of a private wireless network; codes for identifying a private wireless network credential associated with the private wireless network; codes for determining whether the private wireless network supports the private wireless network credential; and codes for accessing, based at least in part on the determination that the private wireless network supports the private wireless network credential, the private wireless network using the private wireless network credential.

In various aspects, the private wireless network credential is stored on a user equipment. The identifying the private wireless network credential is associated with the private wireless network is in part based on an indication associated with the private wireless network credential. The private wireless network credential is associated with a plurality of private wireless network identifiers. The private wireless network credential is stored in a universal subscriber identification module (USIM) application of the user equipment. The private wireless network credential is associated with a plurality of private wireless network identifiers. The private wireless network identifiers are stored as part of a closed subscriber group identification (CSG-ID) in a universal subscriber identification module (USIM) application of the user equipment. The private wireless network credential is different from a credential used to access the public wireless network.

Aspects generally include a method, apparatus, system, computer program product, non-transitory computer-readable medium, user equipment, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
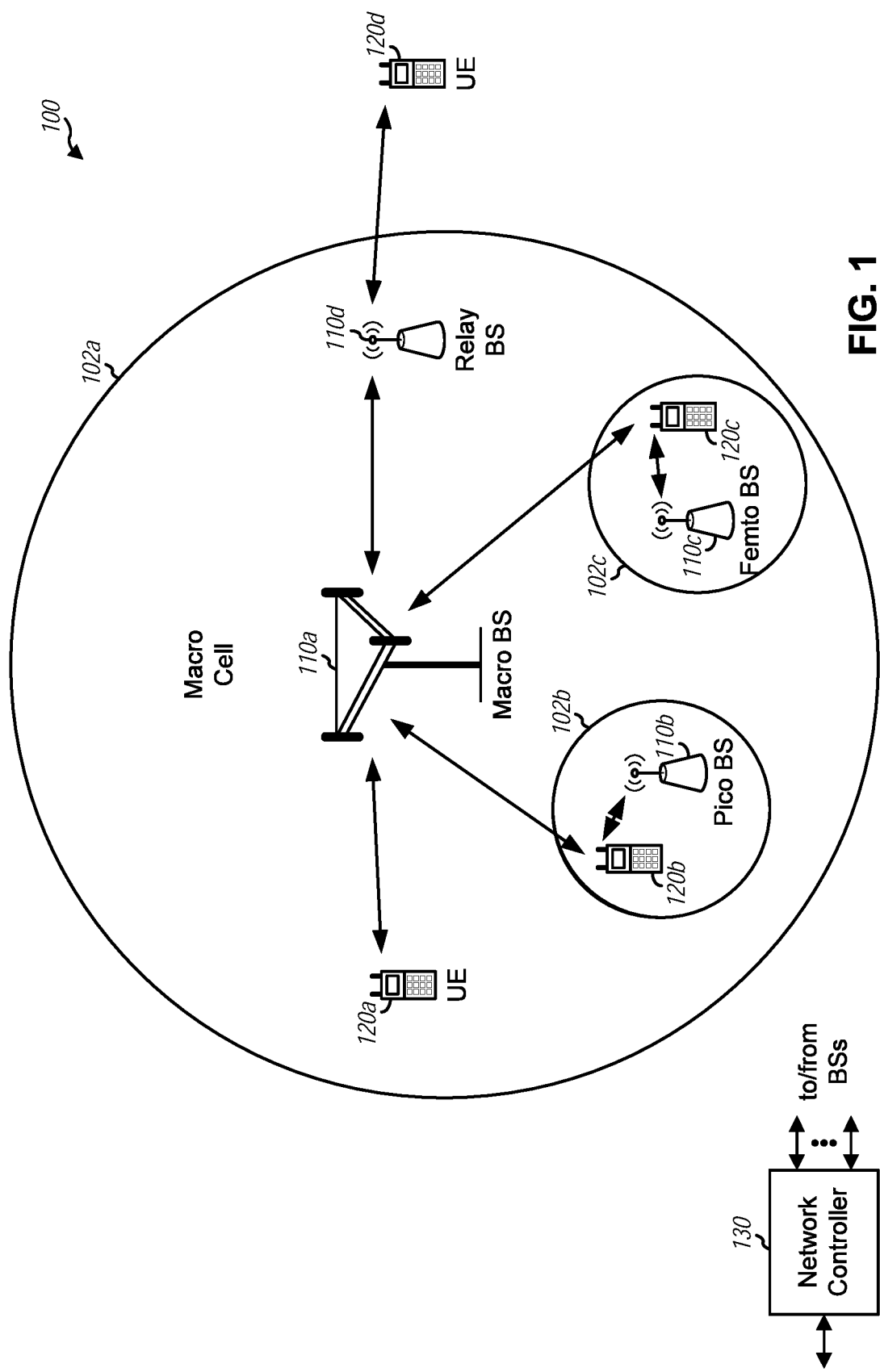
FIG. 1 is a block diagram conceptually illustrating an example of a wireless communication network, in accordance with certain aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP- GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

A wireless network, such as a wireless network including an evolved packet core (EPC) and a radio access network (RAN) connected to the EPC, may be identified using a network identifier, such as a public land mobile network (PLMN) identification. A PLMN identification may correspond to an administration, a mobile network operator (MNO), a collective of MNOs, and/or the like. A UE may store subscription information identifying at least one PLMN identification to which the UE is subscribed, and may access a wireless network when the UE detects a cell is associated with one of the at least one PLMN identification. The UE may store one or more credentials associated with the at least one PLMN identification. Thus, a UE may connect to a wireless network that the UE is permitted to access according to a subscription associated with the UE using the one or more credentials associated with the at least one PLMN identification. Some PLMN identifications may be shared between multiple wireless networks. For example, a neutral host network indicator (NHN-I) of networks associated with the Citizens Broadband Radio Service (CBRS) Alliance is a PLMN identification that may be shared between wireless networks and/or cells that are parties to the CBRS Alliance.

In some aspects, cells in a wireless network may be associated with a closed subscriber group (CSG). A CSG may restrict access to the cells in the wireless network to a predefined list of UEs or subscribers belonging to the CSG. A wireless network associated with a CSG subscription may have a separate network identifier in addition to the PLMN identification. For example, the separate network identifier may include a CSG identifier, which is sometimes termed a csg-Identity. In some aspects, a UE may store information identifying CSG identifiers for wireless networks to which the UE is configured or permitted to connect. In some aspects, the information identifying the CSG identifiers may be termed a CSG list.

In other aspects, cells in a wireless network may be associated with a private wireless network. A private wireless network may include a radio access network (RAN) and/or at least a portion of an evolved packet core (EPC). A private wireless network may restrict access to the cells in the wireless network to one or more UEs that may have a private wireless network credentials. In an example, the private wireless network credentials may be used only to access the private wireless network and not a wireless communication network associated with a PLMN ID. For example, the private wireless network credential may be different from a credential associated with a wireless network having a PLMN ID. A private wireless network may have a separate private network identifier in addition to the PLMN identification and/or the CSG identification (as discussed above). For example, the separate network identifier may include a private wireless network identifier. In some aspects, a UE may store information identifying private wireless network identifiers for the private wireless networks to which the UE is configured or permitted to connect using a private wireless network credential. In some aspects, the information identifying the private wireless network identifiers may include private wireless network credentials that may be used by the UE to access the private wireless network.

A cell of a wireless network that uses a shared PLMN identity may be configured as a first type of cell, a second type of cell with regard to a CSG configuration of the cell or a third type of cell with regard to a private wireless network configuration of the cell. The first type of cell may be termed a hybrid cell, the second type of cell may be termed a closed cell and/or a CSG cell, and the third type of cell may be termed a private wireless network cell. A hybrid cell may transmit a CSG indicator that is set to a false value, and may transmit a CSG identifier (e.g., in system information, such as a system information block 1 (SIB1)). A hybrid cell configuration may be useful for a cell when the cell is shared by a 3GPP MNO's core network (e.g., evolved packet core (EPC)) using a multi-operator core network (MOCN)-based RAN sharing configuration, since the closed cell configuration can restrict a subscriber from accessing the RAN. A CSG cell may transmit a CSG indicator that is set to a true value, and may transmit a CSG identifier. A cell of a private wireless network may transmit a private wireless network indicator and may transmit a private wireless network identifier.

When a UE identifies a CSG cell (e.g., by detecting the CSG indicator set to the true value), the UE may perform an access procedure. The access procedure may include the UE attempting to access a wireless network via the CSG cell (e.g., using a credential associated with a PLMN ID) when the PLMN identification of the wireless network and the CSG identifier of the cell may be included in the subscription information stored by the UE (e.g., a CSG list and/or information identifying PLMN identities associated with the UE). Thus, in some cases, the access procedure carried out by a UE for a CSG cell may involve the UE determining that the UE may not attempt to access the cell. On the other hand, when a UE identifies a hybrid cell with a PLMN identification associated with a subscription of the UE, the UE may attempt to connect to the hybrid cell irrespective of whether a CSG identification of the hybrid cell is included in the subscription information of stored by the UE.

In some aspects, a UE may have credentials associated with a public wireless network (e.g., having a PLMN ID). Also, the UE may have a private wireless network credential used for accessing a private wireless network. For example, the private wireless network credential may not access any other wireless networks except for the private wireless network. However, a UE may not know which cells are part of or associated with a private wireless network or a public wireless network and thus may not know when to use the private wireless network credential to access the private wireless network or when to use the credential associated with public wireless network to access the public wireless network. Some techniques and apparatuses, described herein, may include a private wireless network broadcasting an indication (e.g., a private wireless network identifier) of a private wireless network to one or more user equipment (UEs). The indication (e.g. a private wireless network identifier) of the private wireless network may inform the UE that the private wireless network is accessible using a private wireless network credential stored at the UE. Also, UEs may determine a private wireless credential that may be used to access the private wireless network based at least in part on the indication of the private wireless network.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a block diagram conceptually illustrating an example of a wireless communication network 100 in accordance with various aspects of the present disclosure. The wireless communication network 100 may be an LTE network or some other wireless network, such as a 5G or NR network. Wireless communication network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless communication network 100 through various types of backhaul interfaces such as a direct physical connection, a virtual network, and/or the like using any suitable transport network.

Wireless communication network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless communication network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless communication network 100. For example, macro BSs may have a high transmit power level (e.g., 5 to 40 Watts) whereas pico BSs, femto BSs, and relay BSs may have lower transmission power levels (e.g., 0.1 to 2 Watts). Wireless communication network 100 may be associated with a network identifier, such as a PLMN identity. BS 110 may broadcast or advertise the network identifier to UE 120, and UE 120 may access wireless network 110 based at least in part on the network identifier.

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless communication network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In various aspects, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
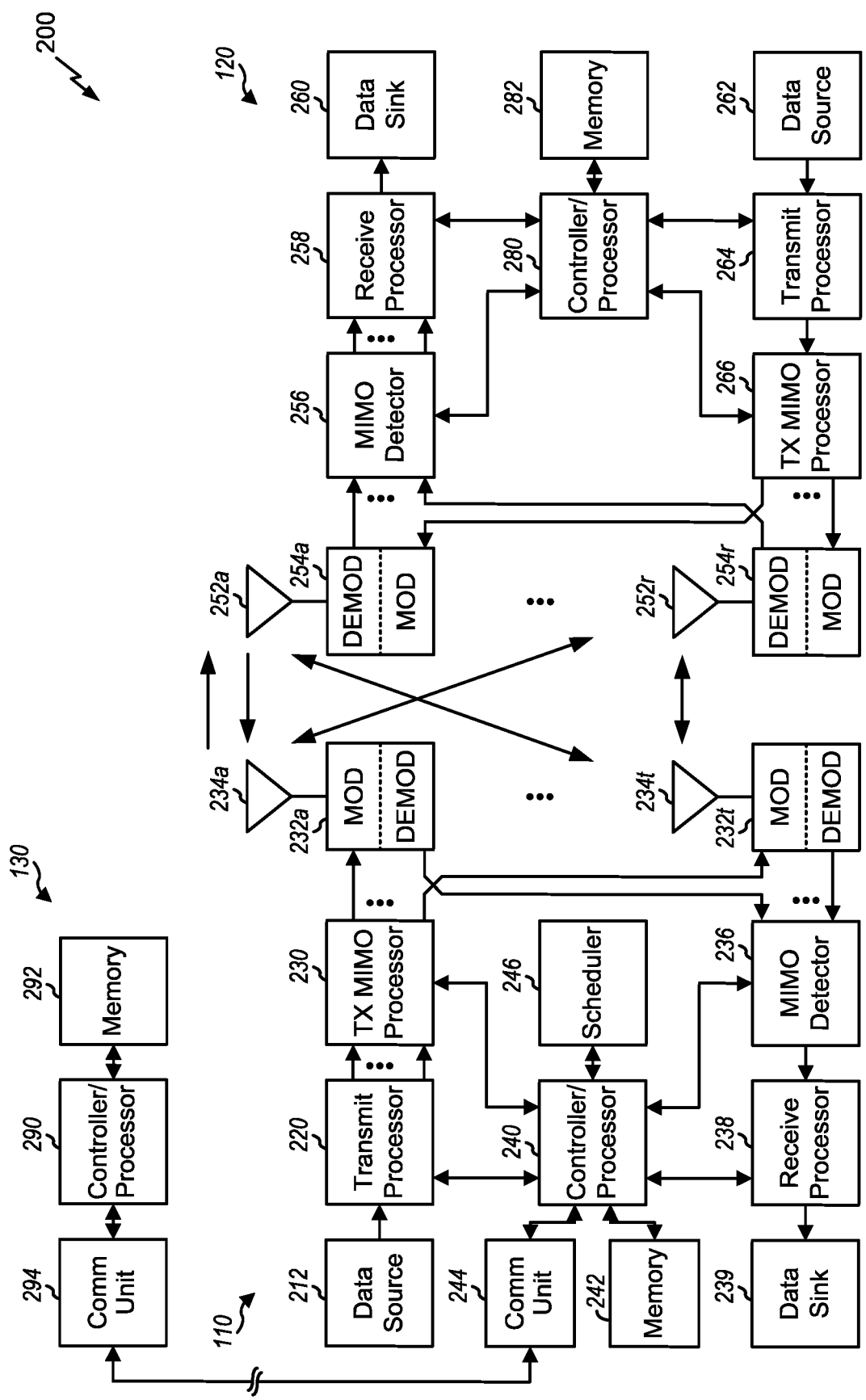
FIG. 2 shows a block diagram conceptually illustrating an example of a base station in communication with a user equipment (UE) in a wireless communication network, in accordance with certain aspects of the present disclosure.

FIG. 2 shows a block diagram of a design of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to certain aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controllers/processors 240 and 280 and/or any other component(s) in FIG. 2 may direct the operation at base station 110 and UE 120, respectively, to perform network access via a hybrid cell associated with a shared PLMN identity. For example, controller/processor 280 and/or other processors and modules at UE 120, may perform or direct operations of UE 120 to perform network access via a hybrid cell associated with a shared PLMN identity. For example, controller/processor 280 and/or other controllers/processors and modules at UE 120 may perform or direct operations of, for example, process 800 of FIG. 8 and/or other processes as described herein. In some aspects, one or more of the components shown in FIG. 2 may be employed to perform example process 800 and/or other processes for the techniques described herein. Memories 242 and 282 may store data and program codes for base station 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

Figure 3:
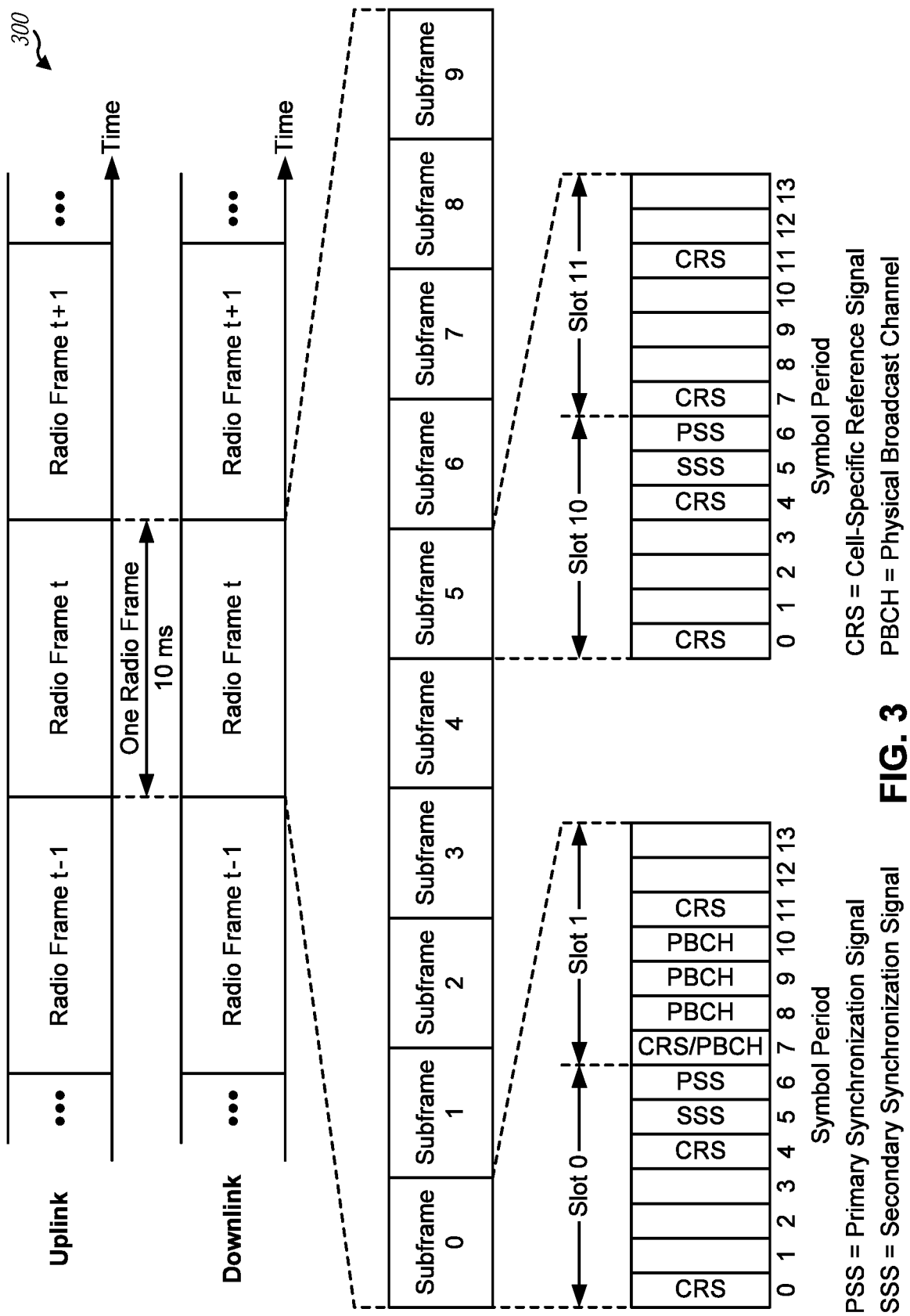
FIG. 3 is a block diagram conceptually illustrating an example of a frame structure in a wireless communication network, in accordance with certain aspects of the present disclosure.

FIG. 3 shows an example frame structure 300 for frequency division duplexing (FDD) in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. For example, the BS may transmit SIB1, which may identify one or more network identifiers (e.g., a PLMN identity, a CSG identifier, etc.) of the BS, a CSG configuration of the BS, and/or the like. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
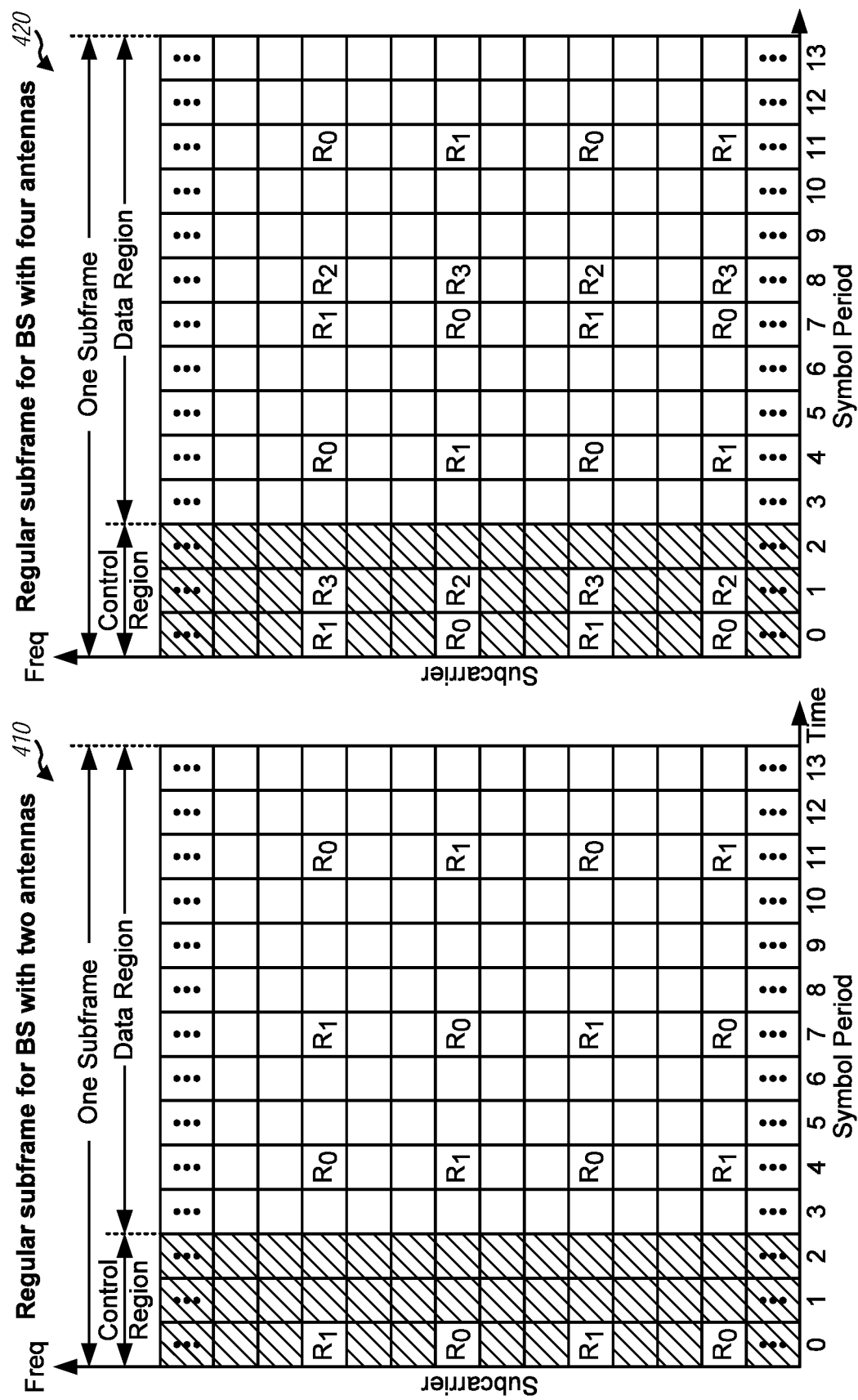
FIG. 4 is a block diagram conceptually illustrating two example subframe formats with the normal cyclic prefix, in accordance with certain aspects of the present disclosure.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7, and 11. A reference signal is a signal that is known a priori by a transmitter and a receiver and may also be referred to as a pilot signal. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP Technical Specification (TS) 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q ∈{0, . . . , Q−1}.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include downlink/uplink (DL/UL) data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals. In some cases, DCells may transmit synchronization signals. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type. In some cases, the RAN may be associated with a network identifier (e.g., a PLMN identity, a CSG identifier, etc.), which may be used to identify cells via which to connect to the RAN.

As indicated above, FIG. 4 is provided merely as an example. Other examples are possible and may differ from what was described with regard to FIG. 4.

Figure 5:
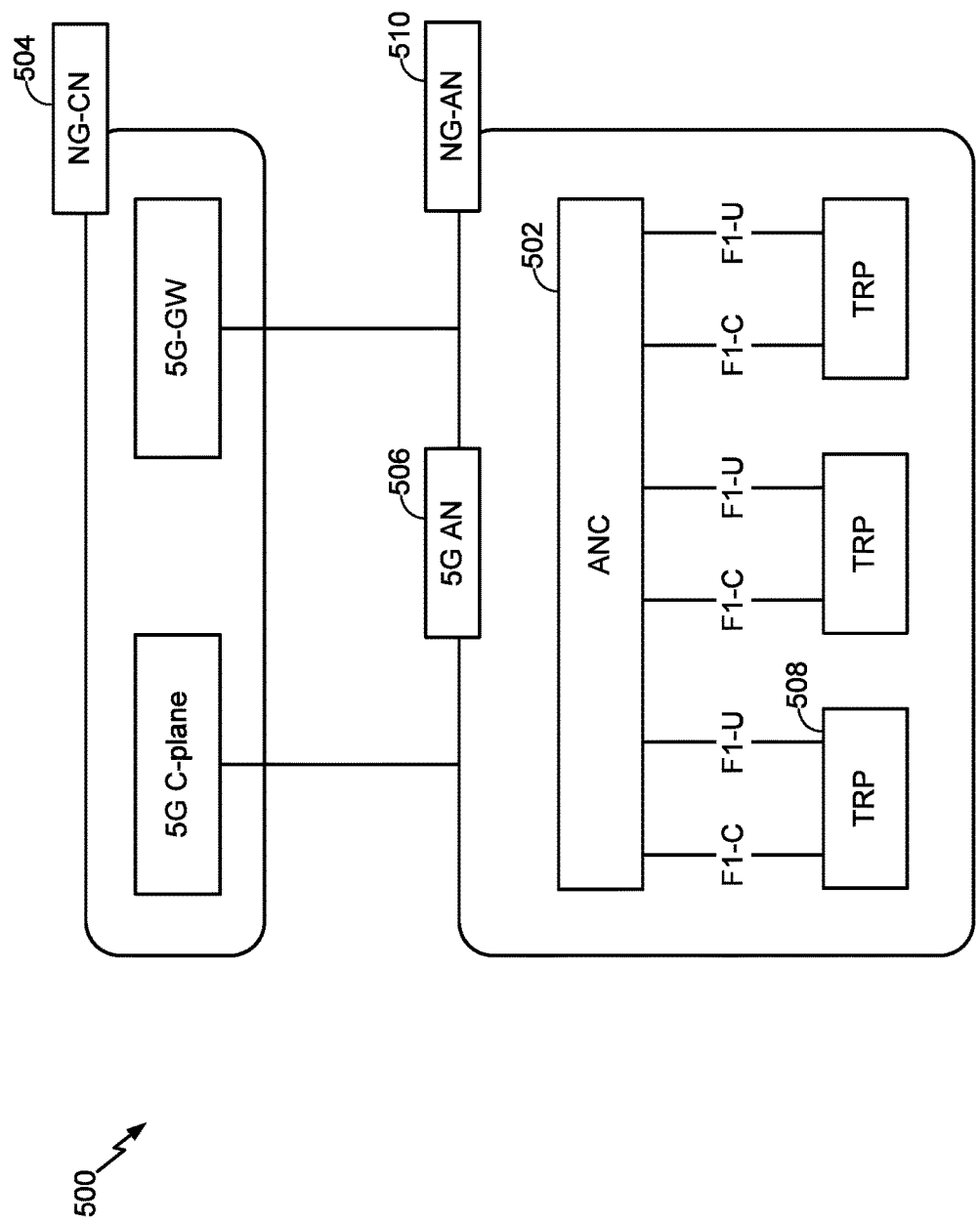
FIG. 5 illustrates an example logical architecture of a distributed radio access network (RAN), in accordance with certain aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to certain aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
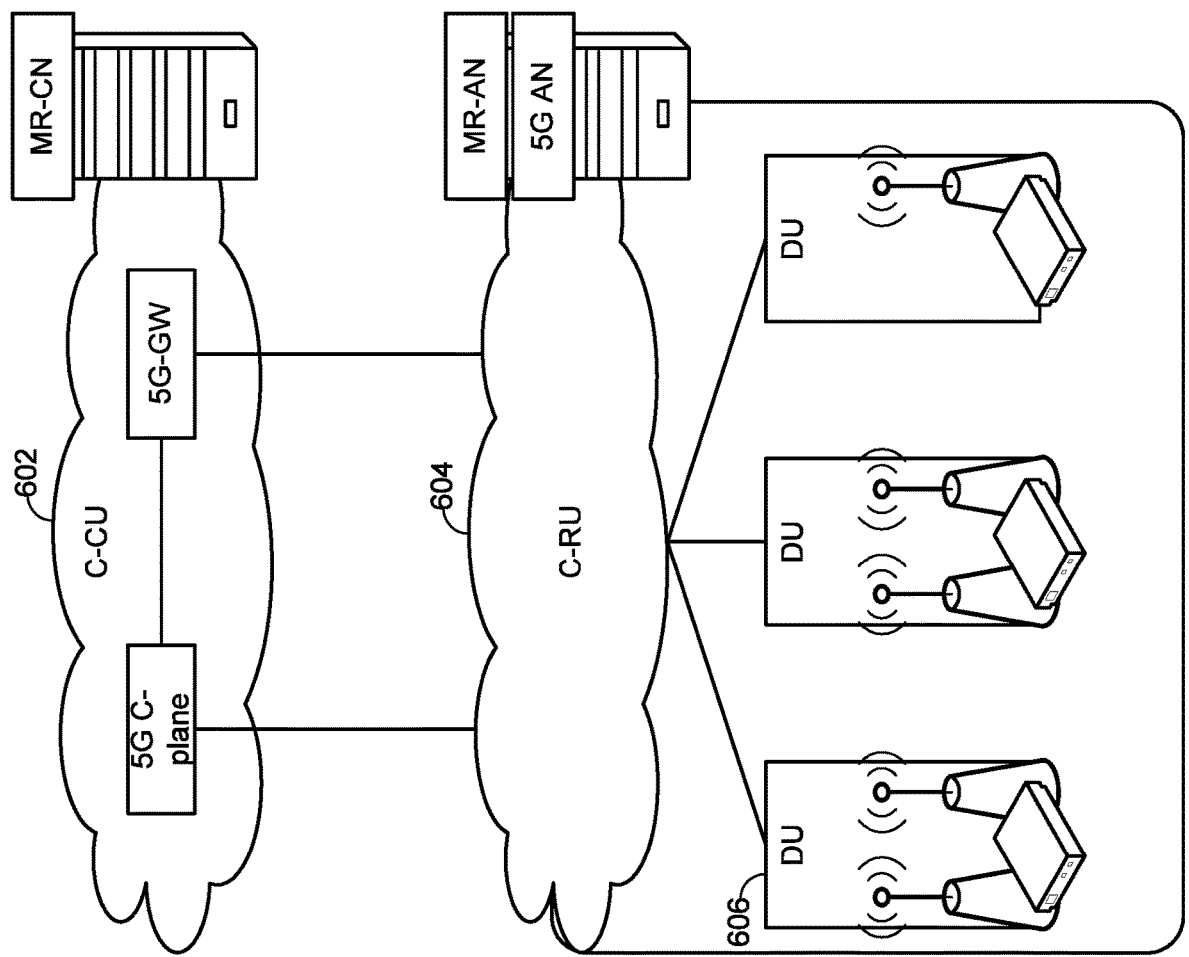
FIG. 6 illustrates an example physical architecture of a distributed RAN, in accordance with certain aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

Figure 7:
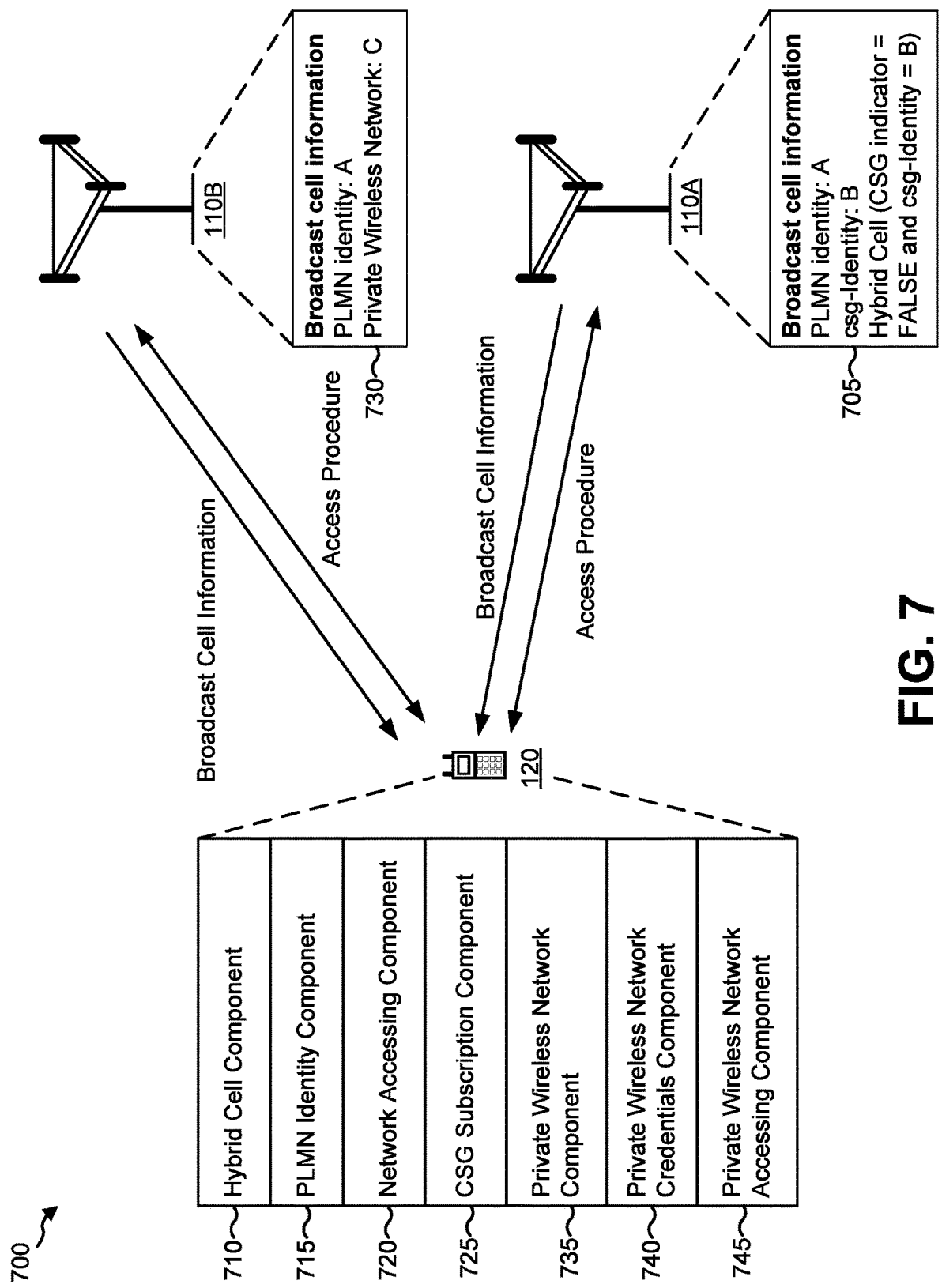
FIG. 7 is a diagram illustrating an example of network access via a private wireless network associated with a shared PLMN identity, in accordance with various aspects of the present disclosure.

FIG. 7 is a diagram illustrating an example 700 of network access via a private wireless network associated with a shared PLMN identity, in accordance with various aspects of the present disclosure. FIG. 7 shows a UE 120 and a first BS 110A and a second BS 110B. Assume that the first BS 110A may provide a first cell and the second BS 110B may provide for a second cell. In various aspects, the UE 120 may be configured with private wireless network credentials that may be used to access one or more private wireless networks and/or a public wireless network credential that may be used to access one or more public wireless networks and a closed-subscriber group (CSG). For the purpose of FIG. 7, description of the first BS 110A and/or the second BS 110B may be interchangeable with description of the cell provided by BS 110, as described in FIG. 1. The first BS 110A and/or the second BS 110B may be connected to one or more core networks where each core network may include one or more components of a SGC, a MuLTEFire core network, a CBRS network core network, and/or other types of core networks.

As shown in FIG. 7, and by reference number 705, a first BS 110A may broadcast first cell information associated with the first BS 110A. As shown, the first cell information may identify at least one network identifier of the first BS 110A. The first cell information may include a PLMN identity of A. In an example, the PLMN identify of A may not be shared (e.g., the PLMN identify may be associated with a single network operator). In another example, the PLMN identity of A may be shared, (i.e., the PLMN identity may be associated with multiple, different network operators). In some aspects, a cell or first BS 110A may be associated with multiple PLMN identities corresponding to multiple networks (e.g., when the cell or the first BS 110A can provide access to the multiple networks). In such a case, the first BS 110A may broadcast the multiple PLMN identities and information associated with each of the multiple PLMN identities using methods similar to those specified by 3GPP for Multi-Operator Core Network (MOCN).

As further shown, the first cell information may include a CSG identifier (e.g., csg-Identity) of B. The CSG identifier of B may indicate that the BS 110 may be associated with a CSG, and the UE 120 may store information indicating whether the UE 120 is permitted to access a wireless communication network via the BS 110 associated with the CSG.

As further shown, the first BS 110A may be configured as a hybrid cell. The first BS 110A may advertise that the first BS 110A is a hybrid cell by transmitting a CSG indicator set to a false value and by transmitting information identifying the CSG identifier of B. As shown by reference number 710, a hybrid cell component 710 of the UE 120 may identify the cell provided by the BS 110 as a hybrid cell (e.g., based at least in part on the CSG indicator and the CSG identity of the cell information).

As shown by reference number 715, a PLMN identify component 715 of the UE 120 may determine that the PLMN identity of A (shown as PLMN ID A) is one of a plurality of PLMN identity values stored in the UE 120. For example, each of the plurality of PLMN identity values may identify PLMN identities for which the UE 120 is to perform an access procedure for a CSG cell. Additionally, or alternatively, at least one of the plurality of PLMN identity values may identify shared PLMN identities. The plurality of PLMN identity values may be stored in USIM application associated with a subscription in the UE 120.

In some aspects, the UE 120 may identify the PLMN identity based at least in part on a set of PLMN identities associated with one or more subscriptions of the UE 120. For example, the UE 120 may be configured to access multiple different networks that are associated with respective sets of PLMN identities. The UE 120 may identify a PLMN identity, of the set of PLMN identities, that is transmitted by the first BS 110A, and may therefore attempt to access a wireless communication network associated with the PLMN identity via the first BS 110A.

As shown by reference number 720, a network accessing component 720 of the UE 120 may access the network via the hybrid cell using an access procedure for a CSG cell. For example, the UE 120 may use the access procedure for the CSG cell based at least in part on the PLMN identity of A being identified by the plurality of PLMN identity values. In an example, the access procedure for the CSG cell may be defined in a 3GPP specification, such as 3GPP TS 36.304, 3GPP TS 23.122, and/or the like. In some aspects, the access procedure for the CSG cell may include determining whether the CSG identifier of B is identified by a CSG list stored by the UE 120, and whether the PLMN identity of A is associated with a subscription of the UE 120. When the CSG identifier of B is identified by the CSG list and when the PLMN identity of A is associated with the subscription, the UE 120 may access the network via the first BS 110A. In other words, and as shown, the UE 120 may determine whether a subscription of the UE 120 allows access to the wireless communication network associated with the PLMN identity of A via a cell with a CSG identifier of B.

In some aspects, the UE 120 may determine that the PLMN identity of A is not identified by the plurality of PLMN identity values. In such a case, the UE 120 may perform an access procedure associated with a hybrid cell. For example, the UE 120 may determine that the PLMN identity of A is associated with a subscription of the UE 120, and may therefore perform an access procedure to connection with a wireless communication network associated with the PLMN identity of A via the first BS 110A.

In some aspects, when a cell is associated with multiple different PLMN identities, the UE 120 may selectively treat the cell as a hybrid cell or a CSG cell. For example, assume that the first BS 110A may be associated with a first PLMN identity and a second PLMN identity. Assume further that the first PLMN identity is identified by the plurality of PLMN identity values and that the second PLMN identity is not identified by the plurality of PLMN identity values. In such a case, the UE 120 may treat the first BS 110A as a hybrid cell with regard to the second PLMN identity, and may treat the first BS 110A as a CSG cell with regard to the first PLMN identity.

In some aspects, the UE 120 may be configured with the plurality of PLMN identity values (e.g., as part of onboarding, as part of information stored in a USIM associated with the UE, as part of subscription provisioning as part of provisioning of the UE 120 during manufacture by device vendor, provisioning of the UE 120 after manufacture by a subscription provider using a network device, a subscription management server, or a device management server, and/or the like). Additionally, or alternatively, the UE 120 may generate the plurality of PLMN identity values. For example, the UE 120 may determine when an access procedure fails due to a CSG identifier of a target cell, and may add a PLMN identity of the target cell to the plurality of PLMN identity values. Additionally, or alternatively, the UE 120 may receive PLMN identities from one or more BSs 110 and may generate the plurality of PLMN identity values from the received PLMN identities.

As shown by reference number 725, csg subscription component 725 of the UE 120 may determine that the subscription of the UE 120 does not allow access to the wireless communication network associated with the PLMN identity of A (e.g., an EPC connected to first BS 110A identified by the PLMN identity A) via a cell with a CSG identifier of B even though the cell is configured as a hybrid cell. Therefore, the UE 120 may not access the wireless communication network via the first BS 110A (e.g., may end an access procedure for the first BS 110A).

In some aspects, the UE 120 may include private wireless network credentials that may be used to access one or more private wireless networks. A mechanism may be needed to inform the UE 120 of a private wireless network and whether private wireless network credentials stored in the UE 120 may be used to access the private wireless network. As described above, the first BS 110A broadcasts a csg indication and csg-identity and if the csg-indication or csg-identity was used to indicate a private wireless network, the UE 120 may access the private wireless network. Thus, a wireless communication network may indicate that it is a private wireless network by broadcasting a private wireless network identifier. The first BS 110 may broadcast an indication of a private wireless network, in addition to, or alternative to, one or more indications of csg and/or csg-identity. In an example, when broadcasting the indication of a private wireless network, the csg-identity information element may be used to broadcast the indication (e.g., private wireless network identifier) of a private wireless network. In another example, the first BS 110 may not broadcast the indication of a private wireless network to indicate that it is not part of a private wireless network, and when not broadcasting the indication of a private wireless network, the csg-identity information elements may be used to broadcast information associated with a CSG.

As shown in FIG. 7, and by reference number 730, a second BS 110B may broadcast second cell information associated with the second BS 110B. As shown, the second cell information may identify at least one network identifier of the second BS 110B. The second cell information may include a PLMN identity of A. In an example, the PLMN identify of A may not be shared (e.g., the PLMN identify may be associated with a single network operator). In another example, the PLMN identity of A may be shared, (i.e., the PLMN identity may be associated with multiple, different network operators). In some aspects, a cell or second BS 110B may be associated with multiple PLMN identities corresponding to multiple networks (e.g., when the cell or the second BS 110B can provide access to the multiple networks). In such a case, the second BS 110B may broadcast the multiple PLMN identities and/or information associated with each of the multiple PLMN identities.

As further shown, the second BS 110B may be associated with a private wireless network. In an example, the private wireless network may include the second BS 110B and/or at least a part of the core network (e.g., network controller 130 as shown in FIG. 1). The second BS 110B may determine whether the second BS 110B is associated with a private wireless network. In an example, the second BS 110B may determine that the second BS 110B may not associated with a private wireless network, and may not advertise or broadcast an indication of private wireless network. In another example, the second BS 110B may determine that the second BS 110B may be associated with a private wireless network, the second BS 110B may advertise/broadcast that the second BS 110B is associated with a private wireless network. In another example, the second BS 110B may determine that the second BS 110B is not associated with a private wireless network, the second BS 110B may not advertise/broadcast that the second BS 110B is associated with a private wireless network.

As described above, the second BS 110B may broadcast an indication (e.g., PWN identifier) of an association with a private wireless network after the determination of the second BS 110B is associated with the private wireless network. The indication of a private wireless network may be broadcasted by the second BS 110B as a disparate information element. In an example, the first cell information may include a private wireless network identifier (e.g., PWN Identifier) of C. The private network identifier may be associated with a PLMN ID (e.g., PLMN ID of A). In another example, the indication of a private wireless network may be set as TRUE/FALSE values and a private wireless identifier may be additionally broadcasted. The TRUE value may indicate that the second BS 110B is associated with a private wireless network and the FALSE value may indicate that the second BS 110B is not associated with a private wireless network. In other examples, the presence of the private network identifier, that may be included in the first cell information, may indicate whether the second BS 110B is associated with a private wireless network. For example, a private network identifier may be transmitted/broadcasted when the second BS 110B is associated with a private wireless network and not transmitted/broadcasted when the second BS 110B is not associated with a private wireless network.

In some aspects, an indication (e.g., PWN identifier) of a private wireless network may be transmitted/broadcasted as a part of and/or along with another network identity. In an example, the indication of a private wireless network may be transmitted/broadcasted as part of an existing network identity. For example, the indication of a private wireless network may be transmitted/broadcasted as a part (e.g., an information element) of the indication of a CSG and/or CSG identity. Also, the second BS 110B may indicate whether the indication (e.g., a private wireless network identifier) of a private wireless network is broadcasted as part of another network identity (e.g., CSG identity). For example, the second BS 110B may not transmit/broadcast an indication of a private wireless network to indicate that the indication (e.g., a private wireless network identifier) of a private wireless network is not transmitted/broadcasted as part of another network identity (e.g., CSG identity). In another example, the second BS 110B may set an indication of a private wireless network to a value (e.g., PWN identifier C) to indicate that the indication (e.g., a private wireless network identifier) of a private wireless network is transmitted/broadcasted as part of another network identity (e.g., CSG identity). In other examples, the indication of a private wireless network may be transmitted/broadcasted as part of a new network identity. In an example, the indication of a private wireless network may be transmitted/broadcasted as part (e.g., an information element) of a closed/open network identity that is being considered by 5G and/or NR.

The PWN identifier of C may indicate that the second BS 110B may be associated with a private wireless network, and the UE 120 may store information (e.g., private wireless network credential) indicating whether the UE 120 is permitted to access a private wireless network via the second BS 110B associated with the private wireless network. For example, the PWN identifier may indicate to the UE 120 that the second BS 110B may be associated with a private wireless network and the UE 120 may use a private wireless network credential to access the private wireless network. In an example, the private wireless network credential may be used to access an associated private wireless network and may not be used to access other wireless communication networks.

As shown by reference number 735, a private wireless network component 735 of the UE 120 may determine that a wireless communication network is a private wireless network. For example, the UE 120 may determine whether a wireless communication network is a private wireless network by identifying cell information. For example, the cell information may provide an indication (e.g., private wireless network identifier) whether the cell is associated with a private wireless network. The UE 120 may read the cell information to determine whether an indication of private wireless network is provided. If an indication of private wireless network is provided in the cell information, the UE 120 may determine that a wireless communication network is a private wireless network. If an indication of private wireless network is not provided in the cell information, the UE 120 may determine that a wireless communication network is not a private wireless network and the UE may not use a private network credential to access the wireless communication network.

In various aspects, the UE 120 may determine that a wireless communication network is not a private wireless network. For example, the UE 120 may determine cell information broadcasted by the second BS 110B may not include an indication of a private wireless network or an information element for an indication of a private wireless network is set to FALSE. The UE 120 may refrain from accessing the private wireless network using a private wireless network credential when the UE 120 determines a wireless communication network is not a private wireless network. In an example, the UE 120 will only access a private wireless network using a private wireless network credential if the UE 120 determines that a wireless network is a private wireless network. Otherwise, the UE 120 will not access a private wireless network using the private wireless network credential.

As shown by reference number 740, a private wireless network credentials component 740 of the UE 120 may identify one or more private wireless network credentials stored on the UE 120. The UE may identify a credential stored on the UE as a private network credential based on an indication (e.g., a private wireless network identifier) associated with the credential. Each of the one or more private wireless network credentials may be associated a plurality of indications (e.g., PWN identifiers) of private wireless networks. For example, the one or more private wireless network credentials may be stored in a universal subscriber identification module (USIM) application on the UE 120. In another example, the plurality of indication (e.g., PWN identifiers) of private wireless networks may be stored as part of a closed subscriber group identification (CSG-ID) in a USIM application on the UE 120. The USIM application on the UE 120 may include a field indicating that the credentials stored in the USIM application are private wireless network credentials. Also, the USIM application on the UE 120 may include one or more fields for CSG ID and/or PLMN ID associated with an indication (e.g., a private wireless network identifier) of a private wireless network. In some aspects, the private wireless network credentials stored in the USIM application on the UE 120 may be determined based at least in part on information associated with the USIM application. For example, an application identifier for the USIM application on the UE 120 may be set to a value to indicate whether private wireless network credentials are stored in the USIM application on the UE 120. In other aspects, the private wireless network credentials stored in the USIM application on the UE 120 may be determined based at least in part on information stored in the USIM application. For example, the USIM application on the UE 120 may include information to indicate private wireless network credentials. In one example, the USIM application on the UE 120 may include a value (e.g., TRUE/FALSE) to indicate private wireless network credentials. In another example, the USIM application on the UE 120 may include a presence (e.g., present=private; absence=no private) of information element to indicate private wireless network credentials. In another aspect, the USIM application on the UE 120 may include an indication (e.g., a list of one or more PNW identifiers) of a private wireless network. Credentials associated with a private wireless network having an indication (e.g., PNW identifier) included in the list may be determined as a private network wireless credential.

As shown, the second BS 110B may transmit/broadcast an indication of a private wireless network and a PLMN ID. For example, the PLMN identity of A (shown as PLMN ID A) may be stored in a plurality of PLMN identity values of the UE 120. For example, the plurality of PLMN identity values may identify PLMN identities for which the UE 120 is to perform an access procedure for a private wireless network. Additionally, or alternatively, the plurality of PLMN identity values may identify shared PLMN identities. In another example, the second BS 110B may transmit/broadcast an indication of a private wireless network and a CSG-ID. The private wireless network credentials may be stored as part of a CSG-ID and/or PLMN ID on the USIM application on the UE 120.

As shown by reference number 745, a private wireless network accessing component 745 of the UE 120 may access the network via the private wireless network using an access procedure for a private wireless network. The UE 120 may determine whether an identified private wireless network supports a private wireless network credential. For example, the UE 120 may match information associated with a private wireless network credential (e.g., a private network identifier associated with private wireless network credential) to an indication of a private wireless network. If the private wireless network credential matches an indication of a private wireless network, the UE 120 may use the access procedure for the private wireless network based at least in part on the indication (e.g., PWN identifier) of a private wireless network. In some aspects, the access procedure for the private wireless network may include determining whether the private wireless network identifier of C is identified by a private wireless network credential stored by the UE 120, and whether the PLMN identity of A is associated with a subscription of the UE 120. When the private wireless network identifier of C is identified by the UE 120 and when the PLMN identity of A is associated with the subscription, the UE 120 may access the private wireless network via the second BS 110B. In other words, and as shown, the UE 120 may determine whether a subscription of the UE 120 allows access to the private wireless network associated with the PLMN identity of A via a cell transmitting/broadcasting an indication (e.g., PWN identifier) of a private wireless network.

As indicated above, FIG. 7 is provided as an example. Other examples are possible and may differ from what was described with respect to FIG. 7.

Figure 8:
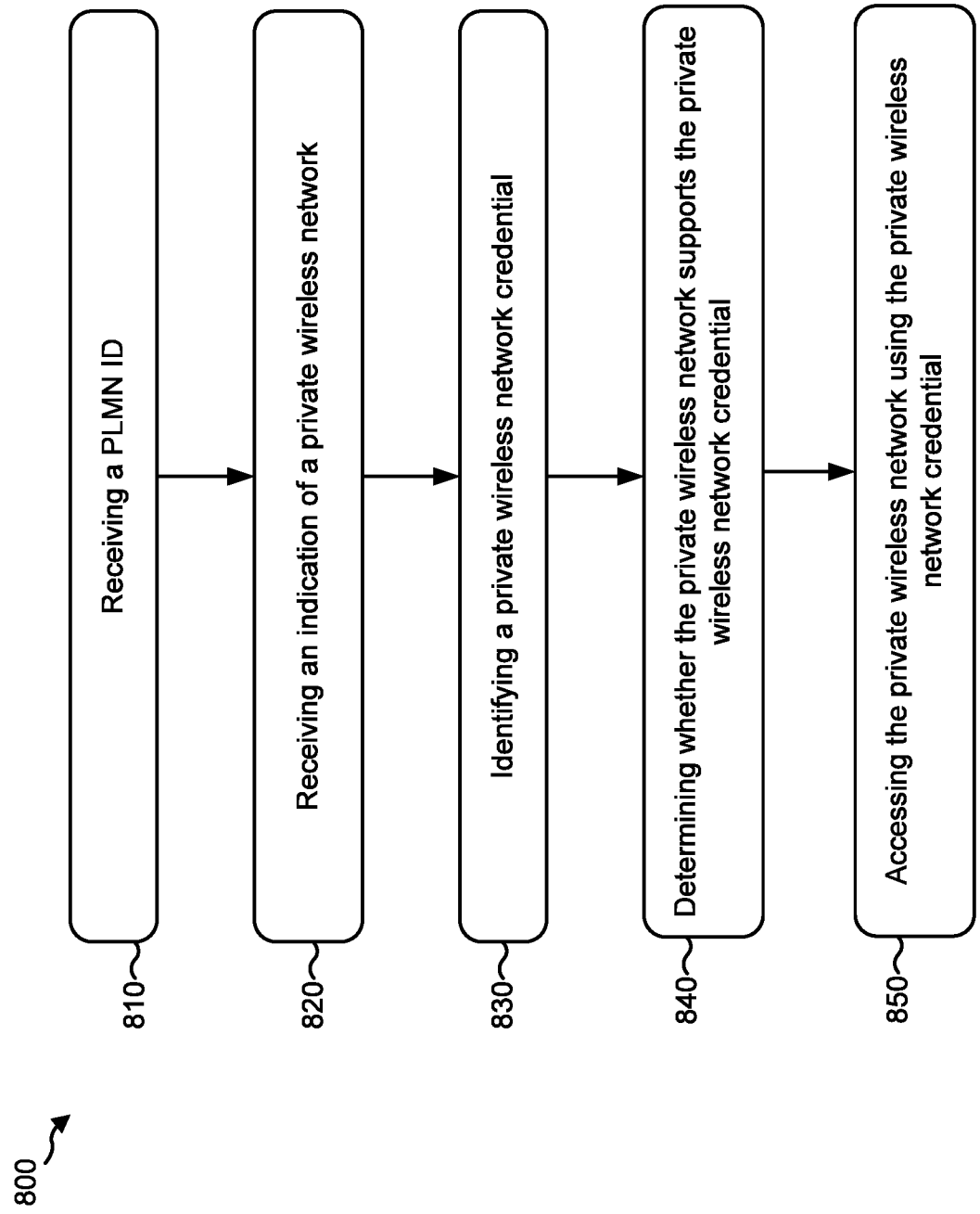
FIG. 8 is a diagram illustrating an example process performed, for example, by a user equipment, in accordance with various aspects of the present disclosure.

FIG. 8 is a diagram illustrating an example process 800 performed, for example, by a UE, in accordance with various aspects of the present disclosure. Example process 800 is an example where a UE (e.g., UE 120) performs network access via a private wireless network associated with a PLMN identity. For explanatory purposes, FIG. 8 will be discussed with reference to the above described UE 120, but it should be understood that in other embodiments other types of UEs may perform the illustrated process.

As shown in FIG. 8, in some aspects, process 800, at block 810, may include receiving a public land mobile network identification (PLMN ID) of a wireless network. For example, the UE 120 may receive cell information (e.g., PLMN ID) of a wireless network. At block 820, receiving an indication of a private wireless network. For example, the UE 120 may determine whether a wireless network is a private wireless network based at least in part on an indication of a private wireless network. At block 830, identifying a private network credential stored on the UE. For example, a private network credential may be stored on a universal subscriber identification module (USIM) application on the UE 120. At block 840, determining whether the private wireless network supports the private wireless network credential. For example, the UE 120 may match an indication (e.g., PWN identifier) of the private wireless network with a private wireless network credential stored in the USIM application on the UE 120. At block 850, accessing the private wireless network using the private wireless network credential. For example, the UE 120 may access the private wireless network using the private wireless network credential based at least in part on the determination that the private wireless network supports the private wireless network credential.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
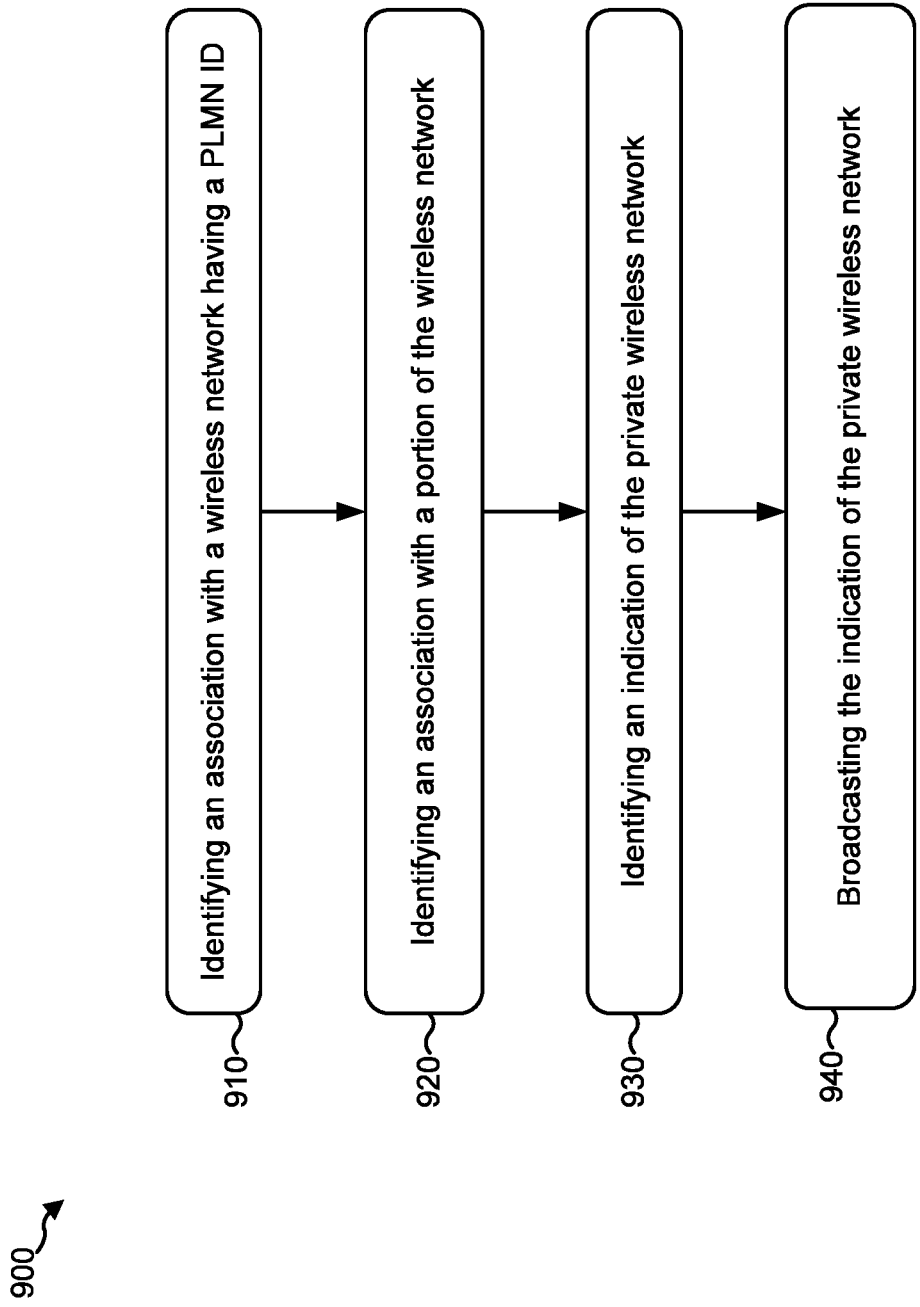
FIG. 9 is a diagram illustrating an example process performed, for example, by a base station, in accordance with various aspects of the present disclosure.

FIG. 9 is a diagram illustrating an example process 900 performed, for example, by a base station, in accordance with various aspects of the present disclosure. Example process 900 is an example where a base station (e.g., base station 110) is part of a private wireless network associated with a PLMN identity.

As shown in FIG. 9, in some aspects, process 900, at block 910, may include identifying an association with a wireless network having a PLMN ID. For example, the base station 110 may identify a PLMN ID that is the base station 110 is associated with. At block 920, the base station 110 may identify an association with a portion of the wireless network. The portion of the wireless network may include a radio access network (RAN) and/or at least a portion of the core network (e.g., network controller 130). In some aspects, the portion of the wireless network may be a private wireless network. In an example, the RAN may include one or more components of a 4G RAN, a 5G RAN, a MuLTEFire RAN, a CBRS RAN and/or other types of RAN. In some examples, the core network may include one or more components of a 5GC, MuLTEFire core network, a CBRS network core network, and/or other types of core networks.

For example, the base station 110 may belong to a portion of the wireless network. In an example, the base station 110 may belong to a private wireless network. At block 930, the base station 110 may identify an indication of the private wireless network. For example, an indication of the private wireless network may inform a user equipment (UE) that the private wireless network is accessible using a private network credential. At block 940, broadcasting the indication of the private wireless network. For example, the base station 110 may broadcast the indication of the private wireless network as a disparate information element of cell information. In another example, the base station 110 may broadcast the indication of the private wireless network as a portion (e.g., an information element) of a network identity.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
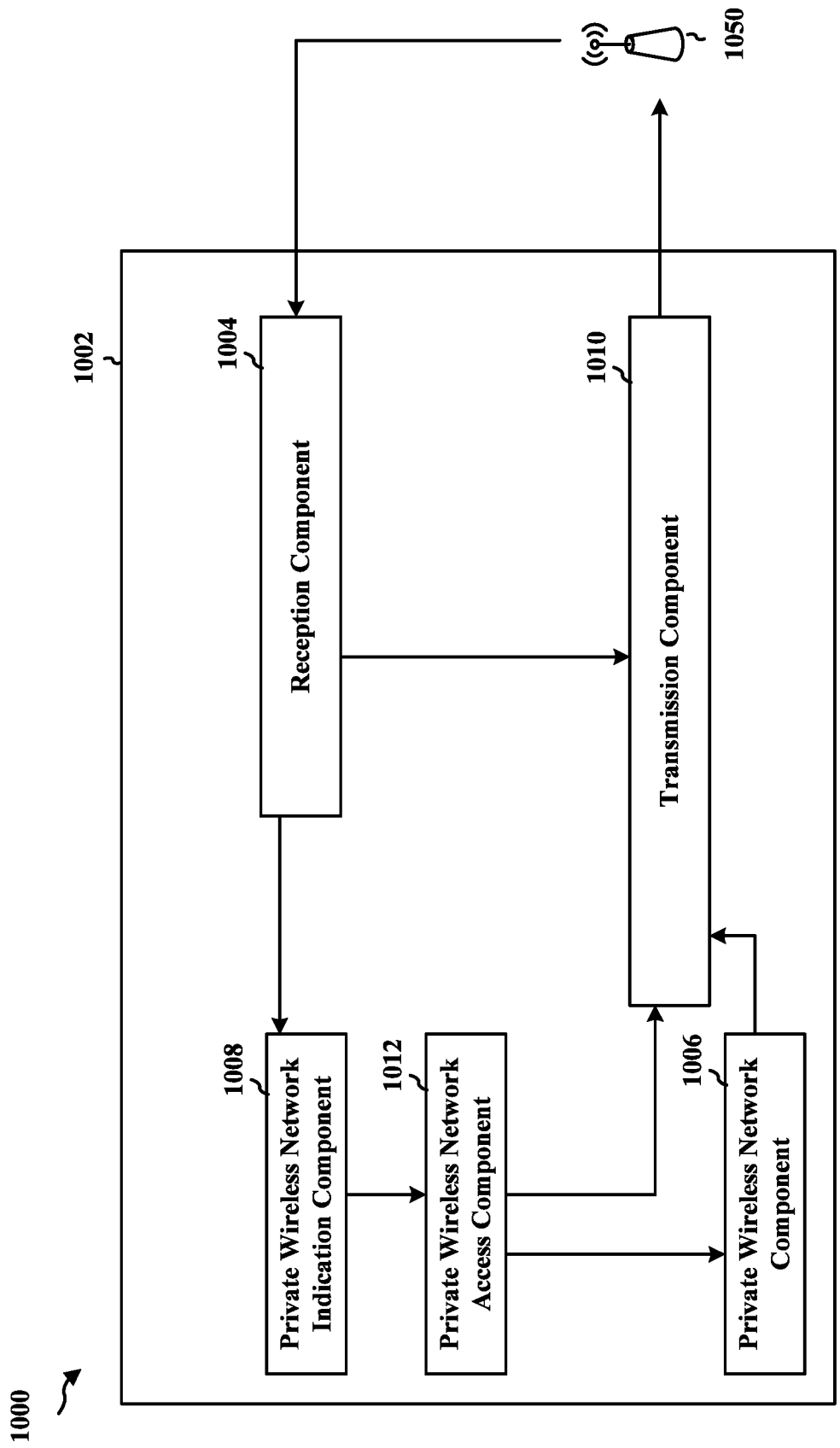
FIG. 10 is a conceptual data flow diagram illustrating the data flow between different means/components in an exemplary apparatus, in accordance with various aspects of the present disclosure.

FIG. 10 is a conceptual data flow diagram 1000 illustrating the data flow between different means/components in an exemplary apparatus 1002, in accordance with various aspects of the present disclosure. The apparatus may be a UE. The apparatus 1002 may include a reception component 1004, a private wireless network component, 1006, a private wireless network indication component 1008, a transmission component 1010, and/or a private wireless network access component 1012. For example, the private wireless network indication component 1008 may receive an indication of whether a base station 1050 is part of a private wireless network. The private wireless network component 1006 may include private wireless network credentials that may be used to access the private wireless networks. The private wireless network access component 1012 may establish access a private wireless network via the base station 1050 using the private wireless network credential. The reception component 1004 may receive one or more message including cell information (e.g., PWN identifier) from the base station 1050. The one or more message from the base station 1050 may indicate to the UE whether the base station 1050 is associated with a private wireless network, which is associated with a PLMN ID. The transmission component 1010 may transmit data communication to the base station 1050.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
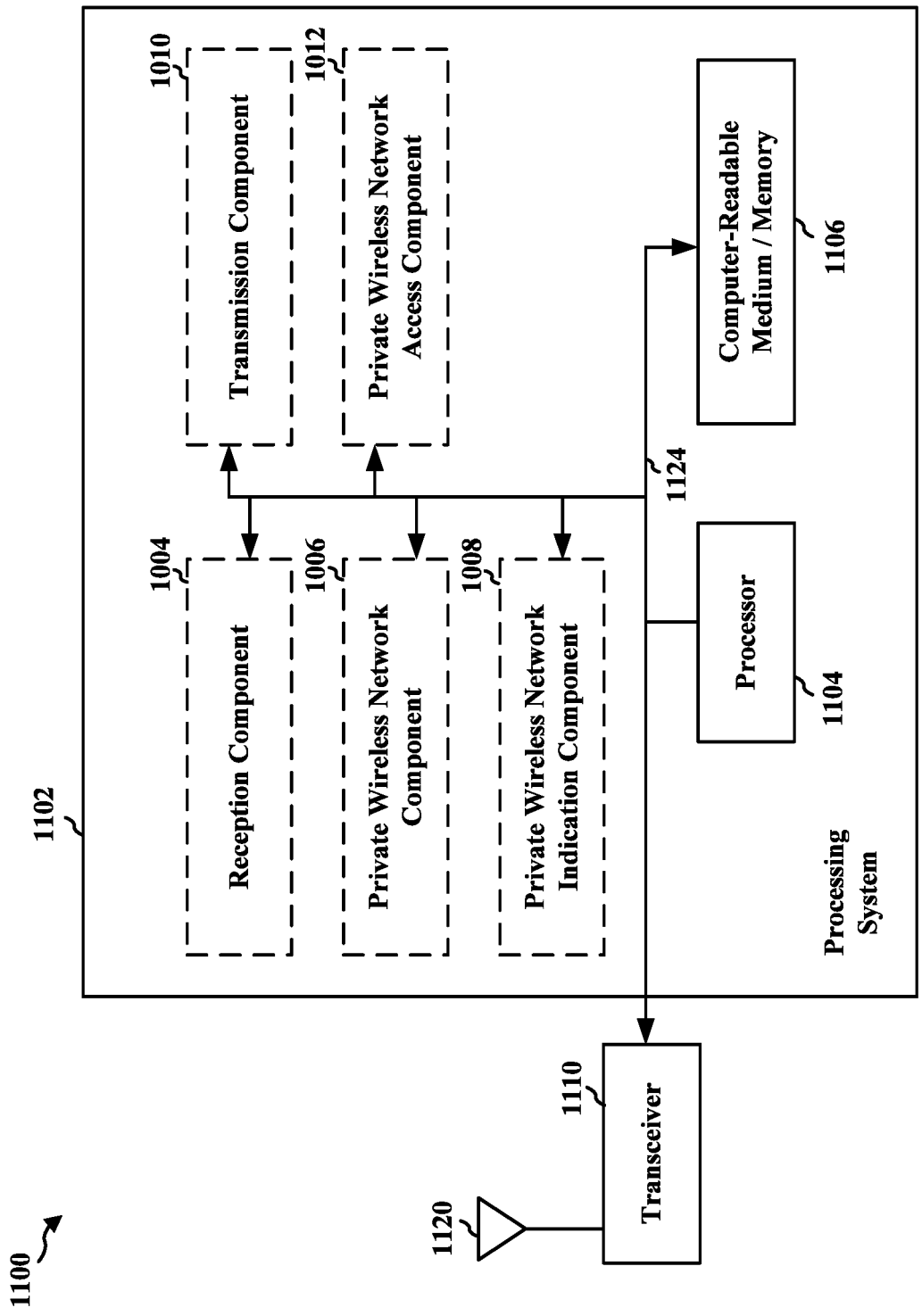
FIG. 11 is a diagram illustrating an example of a hardware implementation for an apparatus employing a processing system, in accordance with various aspects of the present disclosure.

FIG. 11 is a diagram 1100 illustrating an example of a hardware implementation for an apparatus 1102' employing a processing system 1114, in accordance with various aspects of the present disclosure. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1104, 1106, 1108, 1110, and the non-transitory computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the processor 1104. In addition, the transceiver 1110 receives information from the processing system 1114, specifically the transmission component 1110, and based on the received information, generates a signal to be applied to the one or more antennas 1120. The processing system 1114 includes a processor 1104 coupled to a non-transitory computer-readable medium/memory 1106. The processor 1104 is responsible for general processing, including the execution of software stored on the non-transitory computer-readable medium/memory 1106. The software, when executed by the processor 1104, causes the processing system 1114 to perform the various functions described supra for any particular apparatus. The non-transitory computer-readable medium/memory 1106 may also be used for storing data that is manipulated by the processor 1104 when executing software. The processing system 1114 further includes at least one of the components 1104, 1106, 1108, and 1110. The components may be software components running in the processor 1104, resident/stored in the non-transitory computer-readable medium/memory 1106, one or more hardware components coupled to the processor 1104, or some combination thereof. The processing system 1114 may be a component of the base station 110. The processing system 1114 may be a component of the UE 120.

In one configuration, the apparatus 1002/1102 for wireless communication includes means for identifying a wireless networking having a public land mobile network indication (PLMN ID); means for identifying a portion of the wireless network, the portion of the wireless network is a private wireless network; mean for identifying an indication of the portion of the wireless network, the indication informs a user equipment that the portion of the wireless network is accessible using a private network credential; and means for broadcasting the indication of the portion of the wireless network. The aforementioned means may be one or more of the aforementioned components of the apparatus 1002 and/or the processing system 1114 of the apparatus 1102 configured to perform the functions recited by the aforementioned means.

In one configuration, the apparatus 1002/1102 for wireless communication includes means for receiving a PLMN ID of a wireless network; means for receiving an indication of a private wireless network; means for identifying a private network credential associated with the private wireless network; mean for determining whether the private wireless network supports the private network credential; and means for accessing the private wireless network using the private network credential based at least in part on the determination that the private wireless network supports the private network credential. The aforementioned means may be one or more of the aforementioned components of the apparatus 1002 and/or the processing system 1114 of the apparatus 1102 configured to perform the functions recited by the aforementioned means.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method for wireless communication, comprising:
   identifying, by a base station, an association with a wireless network having a public land mobile network identification (PLMN ID);
   identifying, by the base station, an association with a portion of the wireless network, the portion of the wireless network is a private wireless network, and the private wireless network includes a radio access network and at least a portion of a core network of the wireless network;
   identifying, by the base station, an indication of the portion of the wireless network; the indication informs a user equipment that the portion of the wireless network is accessible using a private wireless network credential; and
   transmitting, by the base station, the indication of the portion of the wireless network.

2. The method of claim 1, wherein the portion of the wireless network includes at least a part of a core network and a radio access network (RAN).

3. The method of claim 1, wherein the indication of the portion of the wireless network includes a private wireless network identifier.

4. The method of claim 1, wherein transmitting the indication of the portion of the wireless network includes broadcasting the indication of the portion of the wireless network.

5. The method of claim 1, wherein transmitting the indication of the portion of the wireless network includes transmitting the indication of the portion of the wireless network in an information element associated with a closed subscriber group (CSG).

6. The method of claim 1, wherein the private wireless network credential is different from a credential used to access the wireless network.

7. A method for wireless communication, comprising:
   receiving, by a user equipment, a public land mobile network identification (PLMN-ID) of a public wireless network;
   receiving, by the user equipment, an indication of a private wireless network, the private wireless network includes a radio access network and at least a portion of a core network of the public wireless network;
   identifying, by the user equipment, a private wireless network credential associated with the private wireless network;
   determining, by the user equipment, whether the private wireless network supports the private wireless network credential; and
   accessing, by the user equipment and based at least in part on the determination that the private wireless network supports the private wireless network credential, the private wireless network using the private wireless network credential.

8. The method of claim 7, wherein the private wireless network credential is stored on a user equipment.

9. The method of claim 7, wherein identifying the private wireless network credential is associated with the private wireless network is based at least in part on an indication associated with the private wireless network credential.

10. The method of claim 7, wherein the private wireless network credential is stored in a universal subscriber identification module (USIM) application of a user equipment.

11. The method of claim 7, wherein the private wireless network credential is associated with a plurality of private wireless network identifiers.

12. The method of claim 11, wherein the private wireless network identifiers is stored as part of a closed subscriber group identification (CSG-ID) in a universal subscriber identification module (USIM) application of a user equipment.

13. The method of claim 7, wherein the private wireless network credential is different from a credential used to access the public wireless network.

14. A base station for wireless communication, comprising:
   a memory;
   a processor coupled to the memory, the processor is configured to:
      identify, by the base station, an association with a wireless network having a public land mobile network identification (PLMN ID);
      identify, by the base station, an association with a portion of the wireless network, the portion of the wireless network is a private wireless network, the private wireless network includes a radio access network and at least a portion of a core network of the wireless network;
      identify, by the base station, an indication of the portion of the wireless network; the indication informs a user equipment that the portion of the wireless network is accessible using a private wireless network credential; and
      transmit, by the base station, the indication of the portion of the wireless network.

15. The base station of claim 14, wherein the portion of the wireless network includes at least a part of a core network and a radio access network (RAN).

16. The base station of claim 14, wherein the indication of the portion of the wireless network includes a private wireless network identifier.

17. The base station of claim 14, wherein transmit the indication of the portion of the wireless network includes the processor further configured to broadcast the indication of the portion of the wireless network.

18. The base station of claim 14, wherein transmit the indication of the portion of the wireless network includes the processor further configured to transmit the indication of the portion of the wireless network in an information element associated with a closed subscriber group (CSG).

19. The base station of claim 14, wherein the private wireless network credential is different from a credential used to access the wireless network.

20. An user equipment for wireless communication, comprising:
   a memory;
   a processor coupled to the memory, the processor is configured to:
      receive, by the user equipment, a public land mobile network identification (PLMN-ID) of a public wireless network;
      receive, by the user equipment, an indication of a private wireless network, the private wireless network includes a radio access network and at least a portion of a core network of the public wireless network;

identify, by the user equipment, a private wireless network credential associated with the private wireless network;

determine, by the user equipment, whether the private wireless network supports the private wireless network credential; and access, by the user equipment and based at least in part on the determination that the private wireless network supports the private wireless network credential, the private wireless network using the private wireless network credential.

21. The user equipment of claim 20, wherein the private wireless network credential is stored on a user equipment.

22. The user equipment of claim 20, wherein identifying the private wireless network credential is associated with the private wireless network is based at least in part on an indication associated with the private wireless network credential.

23. The user equipment of claim 20, wherein the private wireless network credential is stored in a universal subscriber identification module (USIM) application of a user equipment.

24. The user equipment of claim 20, wherein the private wireless network credential is associated with a plurality of private wireless network identifiers.

25. The user equipment of claim 24, wherein the plurality of private wireless network identifiers is stored as part of a closed subscriber group identification (CSG-ID) in a universal subscriber identification module (USIM) application of a user equipment.

26. The user equipment of claim 20, wherein the private wireless network credential is different from a credential used to access the public wireless network.

* * * * *